United States Patent
Surnilla et al.

(10) Patent No.: US 9,188,087 B2
(45) Date of Patent: Nov. 17, 2015

(54) EJECTOR FLOW RATE COMPUTATION FOR GAS CONSTITUENT SENSOR COMPENSATION

(71) Applicant: Ford Global Technologies, LLC, Dearborn, MI (US)

(72) Inventors: Gopichandra Surnilla, West Bloomfield, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 13/789,369

(22) Filed: Mar. 7, 2013

(65) Prior Publication Data

US 2014/0257672 A1    Sep. 11, 2014

(51) Int. Cl.
| | |
|---|---|
| F02M 25/07 | (2006.01) |
| F02M 33/04 | (2006.01) |
| F02B 37/12 | (2006.01) |
| F02M 25/08 | (2006.01) |
| F02D 41/00 | (2006.01) |
| F02D 41/14 | (2006.01) |

(52) U.S. Cl.
CPC ............. *F02M 25/07* (2013.01); *F02B 37/127* (2013.01); *F02D 41/0032* (2013.01); *F02D 41/0072* (2013.01); *F02D 41/144* (2013.01); *F02D 41/1454* (2013.01); *F02M 25/071* (2013.01); *F02M 25/089* (2013.01); *F02M 25/0836* (2013.01); *F02M 33/04* (2013.01); *F02D 2200/0406* (2013.01); *F02D 2200/0414* (2013.01); *F02M 25/0754* (2013.01); *F02M 25/0755* (2013.01); *Y02T 10/121* (2013.01)

(58) Field of Classification Search
CPC ... F02M 25/07; F02M 25/0836; F02M 33/04; F02B 37/127
USPC ............ 123/516, 518–520, 568.11, 704, 698; 701/103, 108
See application file for complete search history.

(56) References Cited

U.S. PATENT DOCUMENTS

| | | | | |
|---|---|---|---|---|
| 5,005,550 A | * | 4/1991 | Bugin et al. | 123/520 |
| 6,029,451 A | * | 2/2000 | Gartner | 60/605.2 |

(Continued)

OTHER PUBLICATIONS

Yamada, Shuya S., et al., "Turbocharger Waste Gate," U.S. Appl. No. 13/439,724, filed Apr. 4, 2012, 21 pages.

(Continued)

*Primary Examiner* — Mahmoud Gimie
(74) *Attorney, Agent, or Firm* — Julia Voutyras; Alleman Hall McCoy Russell & Tuttle LLP (57) ABSTRACT

Methods and systems are provided for computing the flow rate at a suction port of an ejector arranged in series with an outlet of an engine system such as a fuel vapor purge system during certain conditions. In one example, the need for a sensor at an ejector suction port may be reduced by adjusting exhaust gas recirculation based on a flow rate at the ejector suction port, the flow rate based on a flow characteristic of the ejector and a flow characteristic of an engine system. The flow rate and a reductant concentration of gases from the engine system may then be used as a basis for compensation of a diluent concentration measurement taken by a gas constituent sensor arranged downstream of the ejector outlet in an engine intake passage, e.g. to improve adjustment of exhaust gas recirculation based on the compensated diluent concentration measurement.

16 Claims, 5 Drawing Sheets

(56) References Cited

U.S. PATENT DOCUMENTS

| | | |
|---|---|---|
| 6,880,534 B2 | 4/2005 | Yoshiki et al. |
| 6,951,199 B2 | 10/2005 | Suzuki |
| 7,966,996 B1 * | 6/2011 | Pursifull ............... 123/518 |
| 2005/0077373 A1 * | 4/2005 | Ikeda ................. 239/34 |
| 2011/0146631 A1 | 6/2011 | Konohara et al. |
| 2011/0307157 A1 * | 12/2011 | Pursifull ............... 701/102 |
| 2012/0095664 A1 * | 4/2012 | Nakamura et al. ......... 701/102 |
| 2013/0191008 A1 | 7/2012 | Surnilla et al. |

OTHER PUBLICATIONS

Surnilla, Gopichandra, et al., "Intake Air Oxygen Compensation for Gas," U.S. Appl. No. 13/789,182, filed Mar. 7, 2013, 32 pages.

Pursifull, Ross Dykstra, "Methods and Systems for an Oxygen Sensor," U.S. Appl. No. 13/849,402, filed Mar. 22, 2013, 24 pages.

* cited by examiner

EJECTOR FLOW RATE COMPUTATION FOR GAS CONSTITUENT SENSOR COMPENSATION

TECHNICAL FIELD

The present application relates to computation of the flow rate of a gas from a vehicle system entering a suction port of an ejector and compensation of gas constituent sensor diluent concentration measurements based on the computed flow rate of the gas.

BACKGROUND AND SUMMARY

In some vehicle systems, exhaust gases and gases from other engine components may enter the engine intake stream during certain conditions. As these gases contain various combinations of reductants, oxidants, and diluents, it may be desirable to determine the composition and flow rate of the gases to determine how they may affect combustion and execute appropriate combustion control actions. Towards this end, one or more gas constituent sensors may be located in the intake passage of a vehicle engine to measure the presence of reductants (e.g., HC), oxidants, and diluents (e.g., $CO_2$ and $H_2O$) in the intake stream. However, in some vehicle systems, gases entering the intake passage upstream of the gas constituent sensor may cause a mis-read of diluents by the gas constituent sensor. Traditional solutions to account for the presence of gases biasing gas constituent sensor readings include determining the flow rate of the gases into the intake passage and using this flow rate, in conjunction with the concentration of the gas as measured by the gas constituent sensor, to determine how to correct the gas constituent sensor's measurements. Determining the flow rate of gases entering the intake passage may often be achieved using only existing sensors, e.g. sensors which are commonly present in vehicle systems such as barometric pressure (BP), compressor inlet pressure (CIP), and manifold air pressure (MAP) sensors. For example, in the case of fuel vapors purged from a fuel vapor purge system into the engine intake via a canister purge valve (CPV), the flow rate may be a function of the vacuum level where the vapors enter the intake passage and the opening amount (e.g., duty cycle) of the CPV.

However, the inventors herein have recognized that determining the flow rate of gases entering an engine intake passage in the manner described above may not be achievable in vehicle systems which incorporate ejectors to generate vacuum (e.g., vacuum used to purge the fuel vapor storage canister, to draw blowby gases from the crankcase into the intake passage, or to recirculate exhaust gases into the intake passage). For example, a suction port of an ejector may be coupled with a fuel vapor purge system, crankcase ventilation system, or exhaust gas recirculation system, instead of or in addition to the system being coupled directly with the intake passage. A motive outlet of the ejector may be coupled with the intake passage, such that the gases entering the suction port of the ejector are directed to the intake passage via the motive outlet of the ejector. In these examples, it may not be possible to calculate the flow rate of gases into the intake passage, as it may not be possible to calculate the flow rate of gases into the ejector suction port using measurements from existing pressure sensors alone. In some systems, an additional pressure sensor may be added at the ejector suction port to enable computation of the flow rate of gases into the ejector suction port, which may constitute all or part of the flow rate of gases into the intake passage (and thus the flow rate of gases at the gas constituent sensor). However, this approach may be undesirable due to the cost of adding a pressure sensor at the ejector suction port (or at each ejector suction port, in examples where more than one system incorporates an ejector to draw gases into the intake passage).

The inventors alone have recognized that the flow rate of gases entering an ejector suction port from a vehicle system may be determined without a dedicated pressure sensor at the ejector suction port by overlaying ejector flow rate characteristics with flow rate characteristics of the vehicle system. For example, in cases where the vehicle system output is arranged in series with the ejector suction port, the intersection of the vehicle system flow rate characteristic and the ejector flow rate characteristic may provide the flow rate of the gas at the ejector suction port, as well as the pressure at the ejector suction port. In examples where the vehicle system output is not arranged in series with the ejector suction port, the flow rate of the gas in paths other than the path to the suction port may be determined using traditional methods (e.g., based on data from existing pressure sensors and other known parameter values such as CPV duty cycle for a fuel vapor purge gases), and the vehicle system flow rate characteristic may be shifted based on the flow rates of the gas in paths other than the path to the suction port. The shifted characteristic and the ejector flow rate characteristic may then be overlaid, and the intersection of the characteristics may provide the flow rate of the gas at the ejector suction port, as well as the pressure at the ejector suction port. In these examples, the flow rate at the ejector suction port may then be summed with the flow rate of the gas in any other paths leading to the intake passage upstream of the gas constituent sensor, to determine the flow rate of the gas as seen by the gas constituent sensor. The controller may then determine how to compensate the measurements taken by the gas constituent sensor based on the flow rate of the gas from the vehicle system as seen by the gas constituent sensor and the concentration of the gas as inferred by the gas constituent sensor.

Thus, in one example, flow rate of a gas from a vehicle system entering an ejector suction port may be determined by a method for an engine which includes overlaying an ejector suction port flow rate vs. vacuum characteristic with a flow rate vs. vacuum characteristic of an engine system communicating with the port, and determining a flow rate of gases from the engine system based on an intersection of the characteristics. The control system may then calculate a reductant (e.g., fuel vapor) concentration of the gases from the engine system using this flow rate and a reductant concentration measurement of the total flow at a gas constituent sensor (e.g., an intake UEGO sensor) arranged downstream of the ejector outlet in an engine intake passage. In some examples, the calculated reductant concentration may then be used to determine the effect of the reductant on diluent concentration measurements of the gas constituent sensor, so as to determine an appropriate compensation for the measurements. As diluent concentration measurements may be used as a basis for exhaust gas recirculation adjustment in some systems, compensating the diluent concentration measurements may improve adjustment of exhaust gas recirculation, among other advantages.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
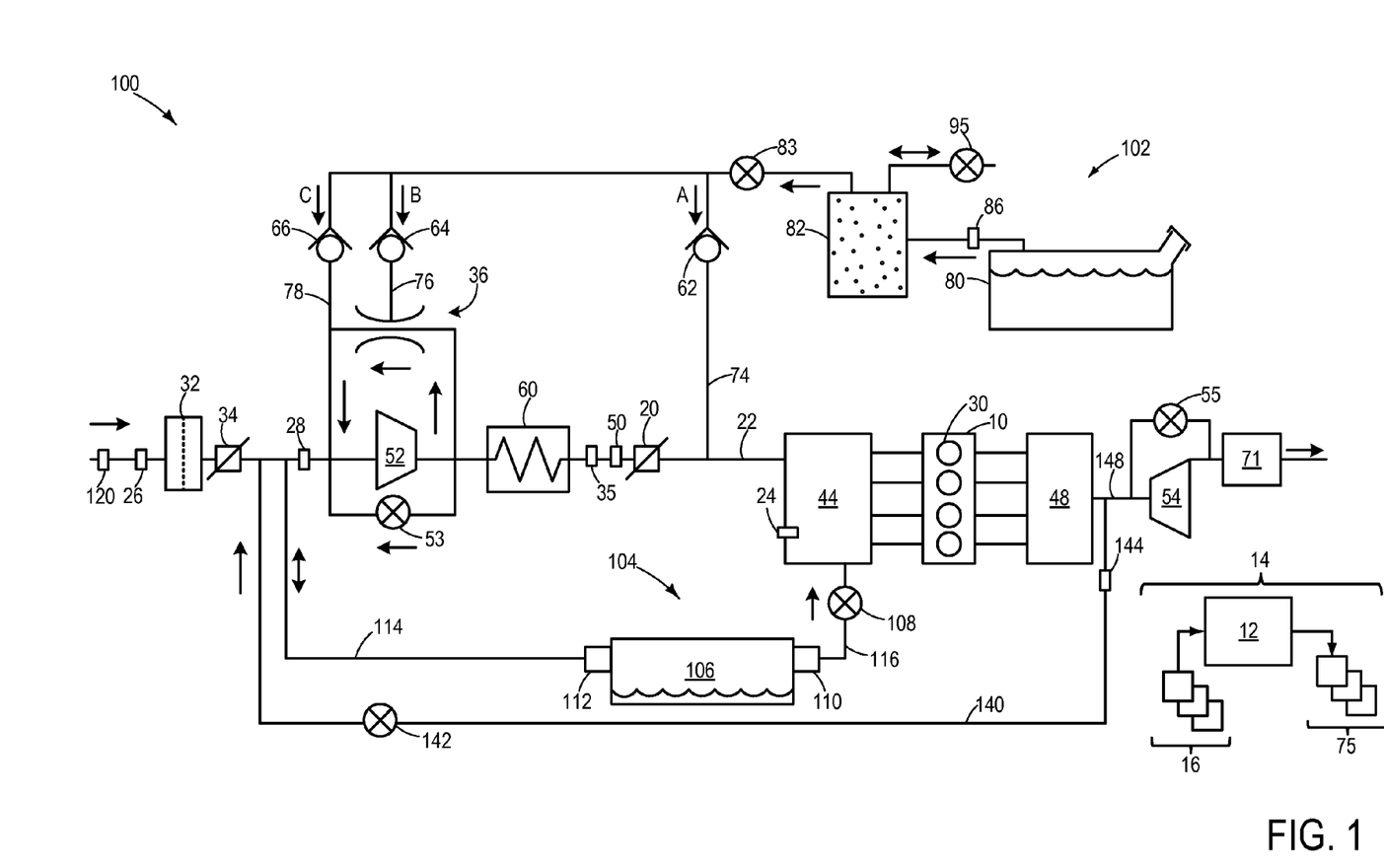
FIG. 1 shows a schematic diagram of a vehicle system.
Figure 2:
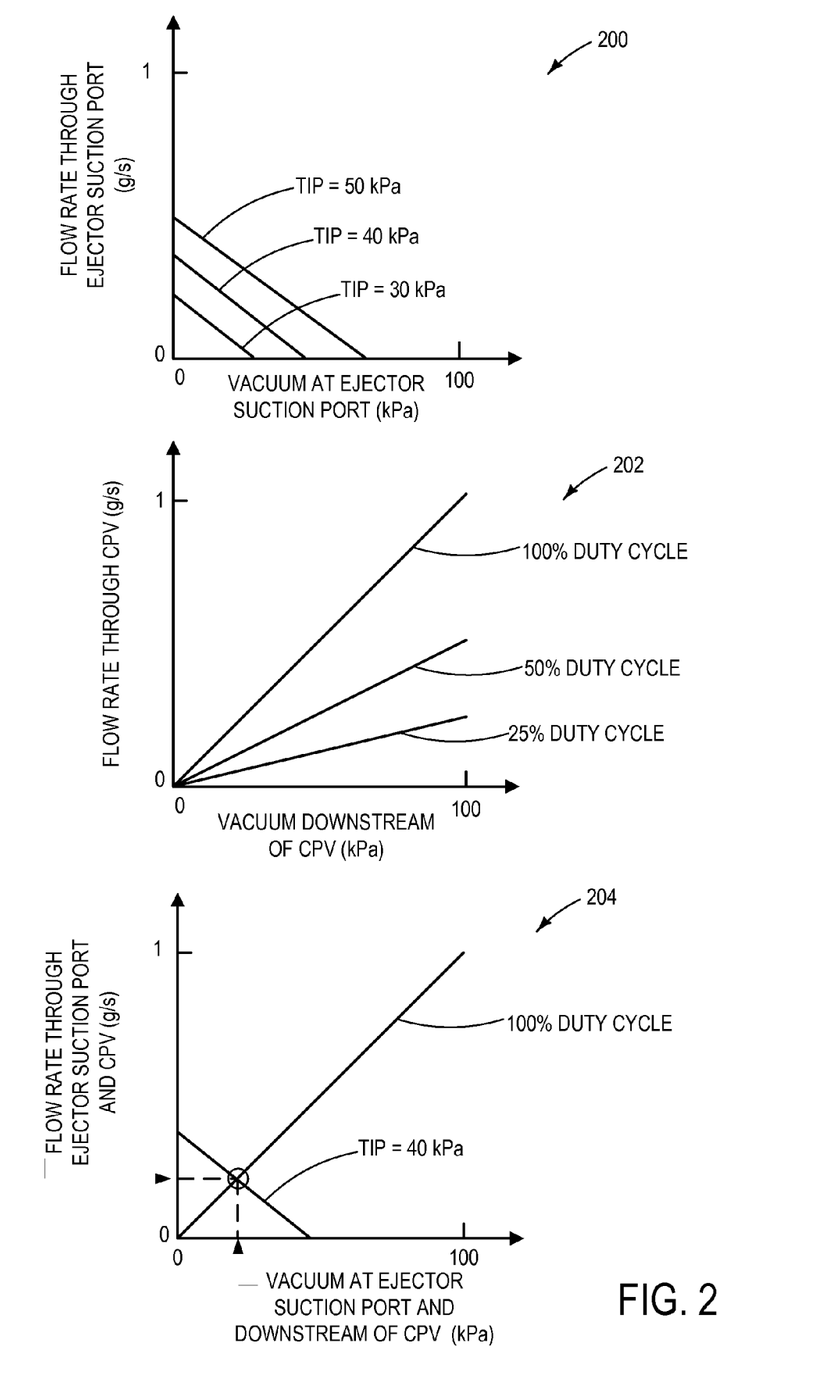
FIG. 2 shows a graph illustrating the relationship between flow rate and vacuum at an ejector suction port, a graph illustrating the relationship between flow rate and vacuum at the outlet of a fuel vapor purge system, and a graph in which the ejector suction port and fuel vapor purge system flow rate/vacuum characteristics are overlaid.

The following description relates to systems and methods for an engine in a vehicle system which includes an ejector suction port coupled with an outlet of an engine system (e.g., a fuel vapor purge system), where an outlet of the ejector communicates with an intake passage of the engine upstream of a gas constituent sensor such as an intake UEGO sensor. As shown in FIG. 1, an EGR system may also communicate with the intake passage upstream of the gas constituent sensor. In some embodiments, such as the embodiment of FIG. 1 where a fuel vapor purge system outlet communicates with an ejector suction port, flow characteristics of the fuel vapor purge system and the ejector may be used as a basis for obtaining the flow rate of gases from the fuel vapor purge system at the ejector suction port independent of sensor readings, as shown in FIG. 2. For example, whereas some systems may include pressure or flow rate sensors at the ejector suction port, the flow characteristics shown in FIG. 2 may instead be used as a basis for obtaining the flow rate (and pressure) at this point in the system. Based in part on this flow rate, it may be possible to compensate readings of a gas constituent sensor downstream of the ejector outlet, as described with respect to the methods of FIGS. 3-5. The compensated readings may improve adjustment of engine operation, e.g. adjustment of EGR.

FIG. 1 shows a schematic diagram of vehicle system 100. Vehicle system 100 includes engine 10 which may be included in a propulsion system of an automobile. Atmospheric air entering an intake passage 22 of engine 10 is directed to an intake manifold 44. Intake manifold 44 is configured to supply the intake air from intake 22, or an air-fuel mixture, to one or more combustion chambers 30 of engine 10. Vehicle system 100 further includes an exhaust manifold 48 and exhaust passage 148 eventually leading to a tailpipe (not shown) that eventually routes exhaust gas to the atmosphere. Engine 10 may be controlled at least partially by a control system 14 including controller 12 and by input from a vehicle operator via an input device (not shown).

An ambient air temperature (AAT) sensor 120 may be arranged at the inlet of intake passage 22 to measure the temperature of ambient air. Further, a barometric pressure (BP) sensor 26 may be arranged at the inlet of intake passage 22 to measure the barometric pressure of ambient air.

Downstream of the AAT and BP sensors, the ambient air entering intake passage 22 may be filtered by an air filter 32. An air induction system (AIS) throttle 34 may be arranged in intake passage 22 downstream of air filter 32. AIS throttle 34 may be controlled via control system 14 to throttle air flowing in intake passage 22. The pressure downstream of the AIS throttle may be adjusted via adjustment of a throttle plate of the AIS throttle. In some examples, when the throttle plate of the AIS throttle is controlled such that the AIS throttle is in an open position, the pressure downstream of the AIS may increase to such an extent that gases from the fuel vapor purge system do not flow in flow path C, as will be described below. Further, the position of AIS throttle 34 may determine whether exhaust gas recirculates into intake passage 22, as described below.

Downstream of AIS throttle 34, engine 10 may further include a compression device such as a turbocharger or supercharger including at least a compressor 52. For a turbocharger, compressor 52 may be at least partially driven by turbine 54 via a shaft (not shown) arranged along the exhaust passage. Wastegate 55 is provided to divert exhaust gases to regulate the speed of turbine 54, for example. For a supercharger, compressor 52 may be at least partially driven by the engine and/or an electric machine, and may not include a turbine. Thus, the amount of compression provided to one or more cylinders of the engine via a turbocharger or supercharger may be varied by controller 12.

Emission control device 71 is shown arranged along the exhaust passage downstream of turbine 54. Emission control devices 71 may be a selective catalytic reduction (SCR) system, three way catalyst (TWC), $NO_x$ trap, various other emission control devices, or combinations thereof. For example, device 71 may be a TWC and device 72 (not shown in FIG. 1) may be a particulate filter (PF). Further, in some embodiments, during operation of engine 10, emission control device 71 may be periodically reset by operating at least one cylinder of the engine within a particular air/fuel ratio.

Vehicle system 100 further includes a compressor bypass valve (CBV) 53 to release pressure in the intake system when the engine is boosted. CBV 53 may allow compressed air to be recirculated into intake passage 22 upstream of compressor 52. For example, CBV 53 may open to recirculate compressed air upstream of compressor 52 to release pressure in the intake system during selected conditions to reduce the effects of compressor surge loading. In one particular example, CBV 53 is vacuum-actuated.

Vehicle system 100 further includes charge air cooler (CAC) 60 arranged along intake passage 22 downstream of compressor 52. CAC 60 may cool intake air that has been heated due to compression by compressor 52, in order to increase the density of the air charge provided to engine 10. By increasing the air charge density, combustion efficiency of the engine 10 may be increased.

Downstream of CAC 60 and upstream of intake manifold 44, intake passage 22 may include a throttle 20. A position of throttle 20 may be varied by controller 12 via a signal provided to an electric motor or actuator included with throttle 20, a configuration that is commonly referred to as electronic throttle control (ETC). In this manner, throttle 20 may be operated to vary the intake air provided to combustion chambers 30 of engine 10. It will be appreciated that in configurations including a supercharger rather than a turbocharger, throttle 20 may be omitted.

Vehicle system 100 further includes a fuel vapor purge system 102. Fuel vapor purge system 102 includes fuel tank 80 which may hold a plurality of fuel blends, including fuel with a range of alcohol concentrations, such as various gasoline-ethanol blends, including E10, E85, gasoline, etc., and combinations thereof. A fuel tank pressure transducer 86 may be included between fuel tank 80 and fuel vapor canister 82, to provide an estimate of a fuel tank pressure, and for engine-off leak detection, for example. Fuel vapor canister 82 may be filled with adsorbent to temporarily trap fuel vapors (including vaporized hydrocarbons) during fuel tank refilling operations and "running loss" (that is, fuel vaporized during vehicle operation). In one example, the adsorbent used is activated charcoal. During refueling, expelled air from tank 80 exits to the atmosphere via canister vent valve (CVV) 95. Further, when air is being passed over the fuel vapor storage media, that air may be sourced from the atmosphere through CVV 95. The flow of air and vapors between fuel vapor canister 82 and the atmosphere may be adjusted via CVV 95. For example, CVV 95 may route gases (e.g., air) out of the fuel vapor purge system 102 to the atmosphere when storing, or trapping, fuel vapors from fuel tank 80. CVV 95 may also allow fresh air to be drawn into fuel vapor purge system 102 when purging stored fuel vapors to intake passage 22.

Fuel vapors released from fuel vapor canister 82, for example during a purging operation, may be directed into intake passage 22, and ultimately into intake manifold 44. The flow of vapor may be regulated by canister purge valve (CPV) 83, coupled between the fuel vapor canister and intake passage 22. For example, controller 12 may control a position of CPV 83 so as to vary a duty cycle of CPV 83, where a duty cycle of 0% corresponds to a fully closed position and a duty cycle of 100% corresponds to a fully open position of CPV 83. Controller 12 may store a current position of CPV 83 in memory (e.g., as a "commanded valve position"), and this information may be used as a basis for purge flow rate computations, as detailed below.

After flowing through CPV 83, the flow of vapor may be directed into one or more flow paths. As shown in FIG. 1, a flow path A couples CPV 83 with intake passage 22 immediately upstream of intake manifold 44 via a line 74, whereas flow paths B and C couple CPV 83 with a suction port and an outlet of an ejector 36 arranged in parallel with compressor 52 (via lines 76 and 78, respectively). A motive flow of compressed intake air through ejector 36 (e.g., a motive flow from an inlet of ejector 36 downstream of compressor 52 to the outlet of ejector 36 upstream of compressor 52) may generate vacuum, which may be used to purge fuel vapors from fuel vapor canister 82 into intake passage 22 upstream of compressor 52 via flow path B. Flow path B may always be open, regardless of pressure differentials within the intake system. A check valve 64 may be arranged in line 76 to prevent reverse flow in that line (e.g., flow from ejector 36 towards CPV 83), a check valve 62 may be arranged in line 74 to prevent reverse flow in that line (e.g., flow from the intake manifold towards CPV 83), and a check valve 66 may be arranged in line 78 to prevent reverse flow in the line (e.g., flow from intake passage 22 upstream of compressor 52 towards CPV 83).

In addition to flow path B, vapor flow from fuel vapor purge system 102 may flow in flow path A when intake manifold pressure is less than barometric pressure. For example, the flow of vapors leaving CPV 83 may diverge into first and second flows, the first flow entering intake passage 22 via flow path A and the second flow entering the suction port of ejector 36 via flow path B. The respective amounts of vapors flowing in paths A and B in this scenario may depend on the pressures at the suction port and the intake manifold. For example, if the suction port pressure is lower (and thus vacuum is higher) relative to the intake manifold pressure, the second flow may be larger than the first flow.

In addition to the flow in path B, or in addition to the flow in paths A and B, vapor may flow in flow path C when compressor inlet pressure is less than barometric pressure. Here again, the respective amounts of vapors flowing in paths B and C (or paths A, B, and C) may depend on the pressures where the paths terminate (e.g. the ejector suction port for flow path B, the intake manifold for flow path A, and the compressor inlet/ejector 36 outlet for flow path C). For example, when the throttle plate of the AIS throttle is controlled such that the AIS throttle is in an open position, the pressure downstream of the AIS may increase to such an extent that gases from the fuel vapor purge system do not flow in flow path C.

It will be appreciated that during conditions where vapor flows only in path B, and not in paths A or C, CPV 83 and the suction port of ejector 36 are arranged in series, and the flow rate through CPV 83 is equal to the flow rate into the suction port.

A positive crankcase ventilation (PCV) system 104 may also be included in vehicle system 100. The combustion chambers 30 may be arranged above a lubricant-filled crankcase 106, in which reciprocating pistons of the combustion chambers rotate a crankshaft. The reciprocating pistons may be substantially isolated from the crankcase via one or more piston rings, which suppress the flow of the air-fuel mixture and of combustion gasses into the crankcase. Nevertheless, a significant amount of fuel vapor may 'blow by' the piston rings and enter the crankcase over time. To reduce the degrading effects of the fuel vapor on the viscosity of the engine lubricant and to reduce the discharge of the vapor into the atmosphere, the crankcase may be continuously or periodically ventilated via PCV system 104. In the configuration shown in FIG. 1, PCV system 104 includes a PCV valve 108 arranged in line 116, which couples intake manifold 44 and crankcase 106 via intake-protecting oil separator 110. The PCV valve may be any fixed or adjustable portioning valve. In one embodiment, the direction of ventilation air flow through the crankcase depends on the relative values of the manifold air pressure (MAP) and the barometric pressure (BP). Under unboosted or minimally boosted conditions (e.g., when BP>MAP) and when PCV valve 108 is open, air enters the crankcase via crankcase vent tube 114 and is discharged from the crankcase to intake manifold 44 via line 116. In some embodiments, a second oil separator 112 may be present between crankcase 106 and crankcase vent tube 114, as shown.

Further, an exhaust gas recirculation (EGR) system may route a desired portion of exhaust gas from exhaust passage 148 to intake passage 22 via EGR passage 140. The amount of EGR provided to intake passage 22 may be varied by controller 12 via EGR valve 142. Additionally or alternatively, EGR may be drawn from the exhaust system to the intake air system when AIS throttle 34 is partially closed. Further, an EGR sensor 144 may be arranged within the EGR passage and may provide an indication of one or more pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

A throttle inlet pressure (TIP) sensor 35 may be arranged downstream of CAC 60 and upstream of throttle 20. Further, a gas constituent sensor such as an intake universal exhaust gas oxygen (UEGO) sensor 50 may be arranged downstream of CAC 60 and upstream of throttle 20. The primary function of intake UEGO sensor 50 may be the measurement of diluent concentration, specifically with regard to diluents $N_2$, $CO_2$, and $H_2O$. For example, intake UEGO sensor 50 may be arranged downstream of the junctures of EGR passage 140, crankcase vent tube 114, as shown in FIG. 1, and thus the sensor may measure the concentration of diluents $N_2$, $CO_2$, and $H_2O$ from the EGR system, $N_2$, $CO_2$ and $H_2O$ from crankcase gases, and $H_2O$ in intake air (due to humidity). However, as shown in FIG. 1, intake UEGO sensor 50 may also be arranged downstream of line 78, and thus a mixture of fuel vapor and air from fuel vapor purge system 102 entering intake passage 22 upstream of intake UEGO sensor 50 may affect the measurements of the intake UEGO sensor. For example, fuel vapor (e.g., HC) may behave as a reductant at the intake UEGO sensor, thereby reducing the partial pressure of oxygen measured by the sensor and causing a mis-read of diluents by the sensor.

In order to compensate for influence of the fuel vapor/air mixture on the intake UEGO sensor's measurements, it may be necessary to determine the concentration of fuel vapor entering intake passage 22 from line 78, as well as the total flow rate of fuel vapor purge gases entering intake passage 22 from line 78. As will be described with respect to FIGS. 3-5, the flow rate of purge gases at the intake UEGO sensor may be determined by overlaying an ejector suction port flow rate/vacuum characteristic with a fuel vapor purge system flow rate/vacuum characteristic. Then, the fuel vapor concentration of the purge gases may be determined based on the fuel vapor concentration measured by the intake UEGO sensor and the flow rate of purge gases at the intake UEGO sensor. Finally, the fuel vapor concentration of the purge gases may be used to determine how to compensate the diluent concentration measured by the intake UEGO sensor to provide a more accurate diluent concentration, e.g. for use in determining how to adjust EGR.

It will be appreciated that additional measures may be taken to compensate for other factors influencing the measurements of intake UEGO sensor 50. For example, an increased (boosted) pressure may raise the partial pressure of air measured by sensor 50. Accordingly, as sensor 50 may be arranged downstream of compressor 52 as shown in FIG. 1, a pressure sensor at the location of the intake UEGO sensor (in the example of FIG. 1, TIP sensor 35) may be used to compensate for the effect of compressor boost on the partial pressure of oxygen measured by sensor 50.

As described above, vehicle system 100 includes control system 14. Control system 14 is shown receiving information from a plurality of sensors 16 (various examples of which are described herein) and sending control signals to a plurality of actuators 75 (various examples of which are described herein). As one example, sensors 16 may include barometric pressure (BP) sensor 26 located in intake passage 22 upstream of air filter 32, compressor inlet pressure (CIP) sensor 28 located in intake passage 22 upstream of compressor 52, throttle inlet pressure (TIP) sensor 35 and intake UEGO sensor 50 arranged upstream of throttle 20, and manifold air pressure (MAP) sensor 24 located in intake manifold 44. Additionally, other sensors such as fuel tank pressure, intake manifold UEGO, temperature, air-fuel ratio, and composition sensors may be coupled to various locations in vehicle system 100. As another example, the actuators may include actuators for fuel injectors (not shown), AIS throttle 34, throttle 20, canister purge valve (CPV) 83, canister vent valve (CVV) 95, compressor bypass valve (CBV) 53, wastegate 55, and other control valves that are not shown in FIG. 1.

Control system 14 includes controller 12. Controller 12 may be a microcomputer including the following, although not shown in FIG. 1: a microprocessor unit, input/output ports, an electronic storage medium for executable programs and calibration values (e.g., a read only memory chip), random access memory, keep alive memory, and a data bus. Storage medium read-only memory may be programmed with computer readable data representing instructions executable by the microprocessor for performing the methods described below as well as other variants that are anticipated but not specifically listed. For example, the controller may receive communication (e.g., input data) from the various sensors, process the input data, and trigger the actuators in response to the processed input data based on instruction or code programmed therein corresponding to one or more routines. Example control routines are described herein with regard to FIGS. 3-5.

FIG. 2 depicts a graph 200 illustrating the relationship between flow rate and vacuum at an ejector suction port, a graph 202 illustrating the relationship between flow rate through the CPV of a fuel vapor purge system and vacuum downstream of the CPV, and a graph 204 in which the ejector suction port and CPV flow rate/vacuum characteristics are overlaid. Like FIG. 1, FIG. 2 is drawn to an embodiment where an ejector generates vacuum which draws gases from a fuel vapor purge system into the engine intake passage. However, it will be appreciated that in other embodiments, graphs 202 and 204 may be replaced with a graph illustrating the flow rate/vacuum characteristic for another vehicle system directing gases into an ejector suction port and a graph in which the ejector suction port characteristic and the characteristic of that vehicle system are overlaid. For example, in one alternative embodiment, graph 202 may illustrate the flow rate through an EGR passage and the vacuum at the outlet of the EGR system. In another exemplary embodiment, graph 202 may illustrate the flow rate of crankcase gases through a PCV system and the vacuum at the outlet of the PCV system. Graphs 200, 202, and 204 may represent data stored in one or more lookup tables in memory of a control system, e.g. control system 14 of FIG. 1. Alternatively, the graphs may each depict the outputs of functional expressions stored in memory of a control system. As used herein, "overlaying" or "superimposing" graphs 200 and 202 to achieve graph 204 may refer to setting a functional expression for one of the characteristics shown in graph 200 equal to a functional expression for one of the characteristics shown in graph 202 to find the intersection, in one example. Alternatively, another suitable method may be used to find the intersection of characteristics from graphs 200 and 202.

Graph 200 of FIG. 2 depicts the relationship between flow rate and vacuum (e.g., negative pressure) at the suction port of an ejector. The Y-axis of graph 200 represents the flow rate at the suction port of an ejector in grams per second, and the X-axis of graph 200 represents vacuum at the suction port of the ejector in terms of kPa below barometric pressure. As shown in graph 200, flow rate at the suction port of an ejector may decrease as vacuum increases at the suction port of the ejector. For example, in the context of an ejector coupled with a fuel vapor purge system with a CPV, when the CPV is fully open the flow rate of purge gases into the suction port of the ejector may be relatively high. Further, because the CPV is fully open during these conditions, the pressure differential between the ejector suction port and the compressor inlet (where the purge gases end up) may be relatively low. As such, a relatively high flow rate of purge gases into the suction port of the ejector may correspond to a relatively low level of ejector vacuum (e.g., fewer kPa below barometric pressure).

In contrast, when the CPV is fully closed, the pressure differential between the ejection suction port and the compressor inlet may be relatively high, due to the relatively large vacuum generated at the ejector suction port as it drains the gases remaining downstream of the closed CPV. In the example of FIG. 2, the relationship between flow rate and vacuum is different for different TIP values. For the purposes of this discussion, TIP is a gauge pressure. However, it will be appreciated that within the powertrain control module (e.g., within control system 14), TIP is usually both measured and represented as an absolute pressure. While characteristics for TIP values of 30, 40, and 50 kPa are shown, it will be appreciated the control system may store characteristics for other possible TIP values in a lookup table. Alternatively, the control system may determine the characteristic corresponding to a given TIP value using a functional expression, such that the characteristic may be determined for a currently sensed TIP value without requiring storage of an extensive lookup table. Whereas the slope of the characteristic is substantially the same for TIP values of 30, 40, and 50 kPa, the X and Y intercepts of the characteristics are larger for greater TIP values, and smaller for smaller TIP values. Accordingly, during conditions where TIP is relatively high, the maximum ejector flow rate and maximum ejector vacuum may be larger than the maximum ejector flow rate and maximum ejector vacuum during conditions where TIP is relatively low. The ejector characteristics shown in FIG. 2 are exemplary in nature; it will be appreciated that different ejectors may have different characteristics, which may be used without departing from the scope of the invention.

Graph 202 of FIG. 2 depicts the relationship between flow rate through a CPV of a fuel vapor purge system (e.g., CPV 83 of fuel vapor purge system 102) and vacuum downstream of the CPV. The Y-axis of graph 202 represents the flow rate through the CPV in grams per second, and the X-axis of graph 200 represents vacuum downstream of the CPV in terms of kPa below barometric pressure. As shown, the flow rate through the CPV may be directly proportional to the vacuum downstream of the CPV, such that the characteristics of graph 202 are lines with a positive slope. The positive slope may represent the effect of flow resistance of the fuel vapor storage canister (e.g., the pressure of atmospheric air flowing through the fuel vapor storage canister may decrease due to the flow resistance offered by the canister, such that vacuum is generated downstream of the canister). Each characteristic of graph 202 corresponds to a different duty cycle of the CPV. For example, the characteristic labeled "100% duty cycle" represents the relationship between flow rate through the CPV and vacuum downstream of the CPV when the CPV is fully open, the characteristic labeled "50% duty cycle" represents the relationship between flow rate through the CPV and vacuum downstream of the CPV when the CPV is either 50% open, or open 50% of the time, and the characteristic labeled "25% duty cycle" represents the relationship between flow rate through the CPV and vacuum downstream of the CPV when the CPV is either 25% open, or open 25% of the time. As shown, when the CPV duty cycle is larger, a higher flow rate is needed to achieve a given vacuum level relative to when the CPV duty cycle is smaller—at smaller CPV duty cycles, the flow resistance of the CPV may increase the flow resistance of the fuel vapor storage canister, thereby increasing the pressure differential between BP (upstream of the fuel vapor storage canister) and the region downstream of the CPV. The CPV flow rate and vacuum characteristics shown in FIG. 2 are exemplary in nature; it will be appreciated that different fuel vapor purge systems and different CPVs may have different characteristics, which may be used without departing from the scope of the invention. For example, the flow rate versus vacuum curve of the CPV depends on the valve technology used. A laminar flow element, a sharp-edged orifice, and a sonic choke all produce characteristically different pressure versus flow rate curves.

In graph 204 of FIG. 2, characteristics from each of graphs 200 and 202 are overlaid to achieve an intersection point. Specifically, the characteristic of graph 200 corresponding to a TIP value of 40 kPa and the characteristic of graph 202 corresponding to a duty cycle of 100% are superimposed. Graph 204 illustrates just one example; during conditions where TIP has a different value than 40 kPa, and/or conditions where the CPV duty cycle is not 100%, it will be appreciated that different characteristics corresponding to the current TIP value and CPV duty cycle may be overlaid in a similar manner. As shown, the X-axis of graph 204 represents vacuum at the ejector suction port and downstream of the CPV, whereas the Y-axis of graph 204 represents the flow rate through the ejector suction port and the flow rate through the CPV. During conditions where the CPV and the ejector suction port are arranged in series, the vacuum at the ejector suction port may be equal to the vacuum downstream of the CPV, and the flow rate through the ejector suction port may be equal to the flow rate through the CPV. For example, in some systems, the CPV may couple the fuel vapor storage system with the ejector suction port alone, in which case the CPV is always in series with the ejector suction port. In such systems, the vacuum downstream of the CPV is equal to the vacuum at the ejector suction port, and the flow rate through the CPV is equal to the flow rate at the ejector suction port. Accordingly, because the X and Y axes of graphs 200 and 202 in such a system represent the same parameter, the graphs may be overlaid. In this way, although the flow rate at the ejector suction port (which is equal to the flow rate through the CPV) and the vacuum level at the ejector suction port (which is equal to the vacuum level downstream of the CPV) are unknown for a given CPV duty cycle and TIP value, they may be determined by overlaying graphs 200 and 202. Specifically, the X coordinate at the intersection of the characteristics may be the vacuum level at the ejector suction port (and downstream of the CPV), and the Y coordinate at the intersection of the characteristics may be the flow rate through the ejector suction port (and through the CPV). Thus, the flow rate and vacuum at the ejector suction port may be determined without adding an additional pressure sensor to the system at the ejector suction port.

However, in other systems, such as vehicle system 100 of FIG. 1, the passage in which the CPV is arranged may couple the fuel vapor purge system with the ejector suction port as well as other engine components. For example, as shown in FIG. 1, the flow downstream of CPV 83 may diverge into flow paths A, B, and C. Purge gases may flow in flow path B during substantially all engine operating conditions, as the pressure at the ejector suction port may be less than BP during substantially all engine operating conditions. Purge gases may flow in flow path A, in addition to flow path B, when MAP is less than BP. Further, purge gases may flow in flow path C, in addition to flow path B or in addition to flow paths A and B, when CIP is less than BP. During conditions where purge gases flow in flow path A and/or C in addition to flow path B (e.g., conditions where less than all flow leaving the engine system outlet enters the ejector suction port), fuel vapor purge system 102 may not be arranged in series with the ejector suction port. Accordingly, during such conditions, it may be necessary to adjust the CPV flow characteristic based on the flow rate in each flow path leaving the fuel vapor purge system outlet and bypassing the ejector suction port (e.g. flow path A and/or C) before overlaying the characteristics for the ejector and the CPV (e.g., those shown in graphs 200 and 202 of FIG. 2). For example, it may be necessary to shift the CPV characteristic corresponding to the current CPV duty cycle to account for the flow of purge gases in flow path A and/or C, as will be described with respect to FIG. 4. In this way, it may be possible to determine the flow rate and vacuum level at the ejector suction port, without adding an additional pressure sensor to the system, even when the CPV and the ejector suction port are not arranged in series. Alternatively, rather than shifting the CPV flow characteristic, in some embodiments the flow rate and vacuum level at the ejector suction port may determined only during conditions where all flow leaving the outlet of the fuel vapor purge system enters the ejector suction port, for example when the AIS throttle is open and intake manifold pressure is greater than or equal to barometric pressure.

In contrast, during conditions where all flow leaving the fuel vapor purge system outlet enters the ejector suction port, it may not be necessary to shift the CPV flow characteristic or otherwise account for flow in flow paths other than flow path B.

Figure 3:
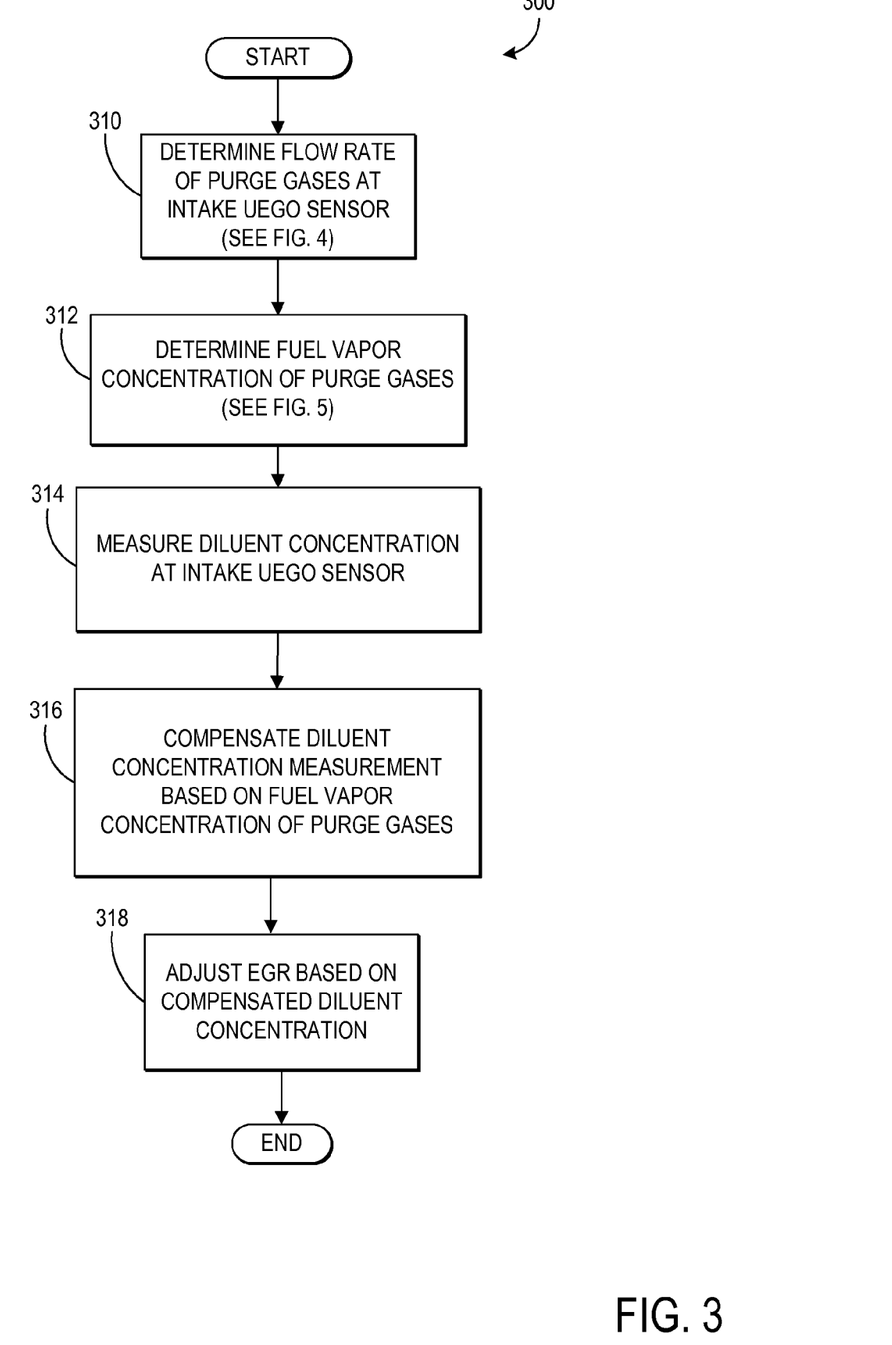
FIG. 3 shows a flow chart illustrating a method for compensating the measurements of a gas constituent sensor arranged in an engine intake passage based on the flow rate and concentration of gases from a fuel vapor purge system.

FIG. 3 shows a flow chart illustrating a method 300 for compensating the diluent concentration measured by a gas constituent sensor arranged in an engine intake passage (e.g., an intake UEGO sensor such as sensor 50 of FIG. 1), based on the flow rate and fuel vapor concentration of purge gases from a fuel vapor purge system. The influence of the presence of fuel vapor on the readings of the gas constituent sensor (e.g., fuel vapor in purge gases entering the intake passage upstream of the gas constituent sensor) may be compensated for so that the gas constituent sensor readings more accurately reflect the amount of diluents (such as $CO_2$ and $H_2O$ from EGR) present in the intake stream. The compensated gas constituent sensor measurements may then be used as a basis for adjustment of EGR, e.g. adjustment of EGR to achieve a desired diluent concentration level in the intake stream.

At 310, method 300 includes determining the flow rate of purge gases at the intake UEGO sensor (e.g., intake UEGO sensor 50 of FIG. 1). In one example, the flow rate of purge gases at the intake UEGO sensor may be determined via the method shown in FIG. 4 and described below. As used herein, "purge gases" refers to gases from a fuel vapor purge system such as system 102 of FIG. 1.

After 310, method 300 proceeds to 312. At 312, method 300 includes determining the fuel vapor concentration of the purge gases (e.g., the fuel vapor concentration of the purge gases as opposed to the fuel vapor concentration of the total flow seen by the intake UEGO sensor). The determination may be made by performing the method shown in FIG. 5, in one non-limiting example. In some examples, the concentration may be stored by the control system as a ratio of moles of fuel vapor (e.g., HC) to liters of oxygen, or as a percent composition.

After 312, method 300 proceeds to 314. At 314, method 300 includes measuring the diluent concentration at the intake UEGO sensor (e.g., the diluent concentration of the total flow seen by the intake UEGO sensor). In one example, the sensor may output a voltage proportional to a concentration of a diluent (e.g., $N_2$, $H_2O$, $CO_2$) in the total flow at the sensor, and this voltage may be sent to the control system (e.g., control system 14 of FIG. 1). The control system may then perform computations based on this voltage to determine the concentration of the diluent (e.g., the $N_2$ concentration) of the total flow seen at the sensor. Measuring the diluent concentration may include measuring the concentration of one diluent of interest, or measuring the concentration of more than one diluent. Further, the controller may control the intake UEGO sensor to measure the concentration of a first group of one or more diluents during a first operating condition, and to measure the concentration of second, different group of one or more diluents during a second operating condition.

After 314, method 300 proceeds to 316. At 316, method 300 includes compensating the diluent concentration measurement (e.g., from step 314) based on the fuel vapor concentration of the purge gases (e.g., as determined at step 312). In one example, the control system may store a lookup table in memory which contains compensation amounts corresponding to different fuel vapor concentrations, and perform a computation incorporating the compensation amount to arrive at a compensated diluent concentration. In another example, the compensation may be performed by the control system by solving an equation with fuel vapor concentration and measured diluent concentration as inputs and compensated diluent concentration as an output.

After 316, method 300 proceeds to 318. At 318, method 300 includes adjusting EGR based on the compensated diluent concentration. As one example, an EGR valve such as valve 142 of FIG. 1 may be adjusted, which may adjust an amount of exhaust gas being recirculated to the engine intake passage. While EGR is adjusted based on the compensated diluent concentration measurement in the example of method 300, in other embodiments, other operations or parameter values may be adjusted based on the compensated diluent concentration (e.g. PCV system operation, AIS throttle opening, main throttle opening, etc.) without departing from the scope of this disclosure.

Figure 4:
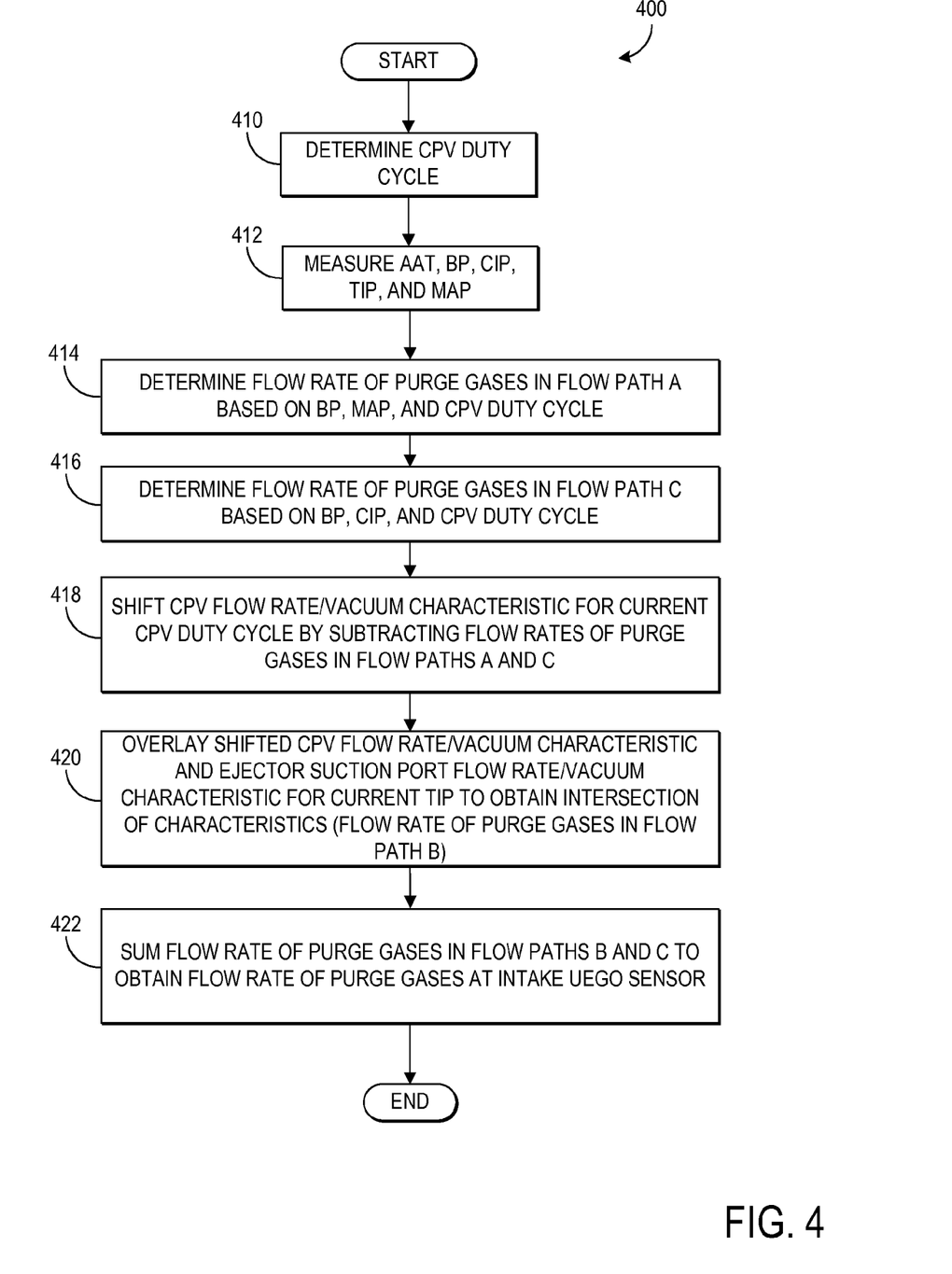
FIG. 4 shows a flow chart illustrating a method for determining the flow rate of gases from a fuel vapor purge system as seen by a gas constituent sensor in an engine intake passage, which may be used in conjunction with the methods of FIGS. 3 and 5.

FIG. 4 shows a flow chart illustrating a method 400 for determining the flow rate of gases from a fuel vapor purge system as seen by a gas constituent sensor in an engine intake passage (e.g., an intake UEGO sensor), which may be used in conjunction with the method of FIG. 3. Specifically, method 400 may be performed at step 310 of method 300, in some examples.

At 410, method 400 includes determining the duty cycle of a CPV (e.g., CPV 83 of FIG. 1). For example, the current duty cycle of the CPV may be stored in memory of the control system, in which case determining the duty cycle of the CPV may include accessing this stored value. A duty cycle of 100% may correspond to a fully open CPV valve, a duty cycle of 50% may correspond to a CPV valve which is open 50% of the time, or halfway open all of the time, and a duty cycle of 0% may correspond to a fully closed CPV valve.

At 412, method 400 includes measuring the values of AAT, BP, CIP, TIP, and MAP. In one example, this step may include the control system receiving sensed values from AAT, BP, CIP, TIP, and MAP sensors (e.g. sensors 120, 26, 28, 35, and 24).

After 412, method 400 proceeds to 414. At 414, method 400 includes determining the flow rate of purge gases in flow path A based on BP, MAP, and the CPV duty cycle. In one non-limiting example, the flow rate of purge gases in flow path A may be a function of BP, MAP, and the CPV duty cycle. The controller may compute this flow rate by substituting the values of BP and MAP measured at step 412 and the CPV duty cycle determined at step 410 into a functional expression.

After 414, method 400 proceeds to 416. At 416, method 400 includes determining the flow rate of purge gases in flow path C based on BP, CIP, and CPV duty cycle. For example, the flow rate of purge gases in flow path C may be a function of BP, CIP, and the CPV duty cycle. The controller may compute this flow rate by substituting the values of BP and CIP measured at step 412 and the CPV duty cycle determined at step 410 into a functional expression.

After 416, method 400 proceeds to 418. At 418, method 400 includes shifting the CPV flow rate/vacuum characteristic for the current CPV duty cycle by subtracting the flow rates of purge gases in flow paths A and C. As described with respect to FIG. 2, during conditions where purge gases flow in one or both of flow paths A and C, in addition to flow path B, the fuel vapor purge system outlet may not be in series with the ejector suction port. Accordingly, in order to determine the flow rate and vacuum at the ejector suction port by overlaying characteristics and finding their intersection (e.g., as shown in graph 204 of FIG. 2), the characteristic representing flow through the CPV and vacuum downstream of the CPV may need to be adjusted to account for the flow of purge gases in flow paths other than flow path B during these conditions. For example, when purge gases are flowing through paths A and/or C, the sum of the purge gas flow rates in the paths may need to be subtracted from the CPV characteristic (e.g., the characteristic shown in graph 202 corresponding to the current duty cycle) before it is overlaid with the ejector suction port characteristic (e.g., the characteristic shown in graph 200 corresponding to the current TIP) to find the intersection as in shown in graph 204. In one non-limiting example where both CIP and MAP are less than BP, the flow rate of purge gases in flow path A may determined to be 0.1 g/s in step 414, and the flow rate of purge gases in flow path C may be determined to be 0.2 g/s in step 416. If the current CPV duty cycle is 100%, the characteristic shown in graph 202 for this CPV duty cycle may be shifted at 418 by −0.3 g/s. Prior to shifting, the slope of this characteristic may be $1/100$ as shown and the Y intercept may be 0, as shown in graph 202, in which case the equation for the characteristic is $Y=(1/100)X$, where Y denotes the flow rate through the CPV and X denotes the vacuum downstream of the CPV. After shifting, the equation for the characteristic may change to $Y=(1/100)X-0.3$. It will be appreciated that for non-linear characteristics, the shifting may involve different computational methods. Further, other approaches may be used to account for the flow of purge gases in flow path A and or C without departing from the scope of this disclosure. In examples where purge gases flow in neither of flow paths A and C, step 418 may be skipped. In practice, depending on the system, a pressure differential may close the check valve in either flow path A or flow path C, such that flow paths A and C are not open at the same time.

After 418, method 400 proceeds to 420. At 420, method 400 includes overlaying the shifted CPV flow rate/vacuum characteristic and the ejector suction port flow rate/vacuum characteristic for the current value of TIP (e.g., as measured at 412) to determine the intersection of the characteristics. The shifted CPV flow rate/vacuum characteristic may represent the flow rate of purge gases in flow path B in relation to the vacuum level of the purge gases in flow path B. Because flow path B is in series with the ejector suction port, the shifted characteristic may be superimposed on the ejector suction flow characteristic, and the intersection of the two characteristics may represent the flow rate through the ejector suction port and the vacuum at the ejector suction port. As described above with respect to FIG. 2, "overlaying" the shifted CPV flow rate/vacuum characteristic and the ejector suction port flow rate/vacuum characteristic may refer to setting a functional expression for the shifted CPV flow rate/vacuum characteristic equal to a functional expression for the ejector suction port flow rate/vacuum characteristic to find the intersection, in one non-limiting example. In other examples, overlaying may refer to another method of finding an intersection of the two characteristics. It will be appreciated that overlaying of the characteristics may occur either literally or a figuratively, depending on how the control system stores the shifted relationship between CPV flow rate and vacuum in memory, and depending on how the control system stores the relationship between ejector suction port flow rate and vacuum in memory.

After 420, method 400 proceeds to 422. At 422, method 400 includes summing the flow rates of fuel vapor purge gases in flow paths B and C to obtain the flow rate of fuel vapor purge gases at the intake UEGO sensor. For example, the flow rate in flow path B determined at step 420 may be stored in memory, the flow rate in flow path C determined at step 416 may also be stored in memory, and the controller may add these two flow rates together to achieve the flow rate of purge gases at the intake UEGO sensor. Although the flow rate of fuel vapor purge gases in flow path A is determined at step 414, in the example vehicle system described herein, flow path A terminates downstream of the intake UEGO sensor, and therefore the flow rate of purge gases in flow path A is used only in determining the flow rate of purge gases and vacuum level in flow path B, and is not used at step 422. However, in other example vehicle systems, flow path A may terminate upstream of the intake UEGO sensor, or the intake UEGO sensor may be arranged downstream of flow path A. In such systems, the flow rate of purge gases in flow path A may also be an addend in step 422.

Figure 5:
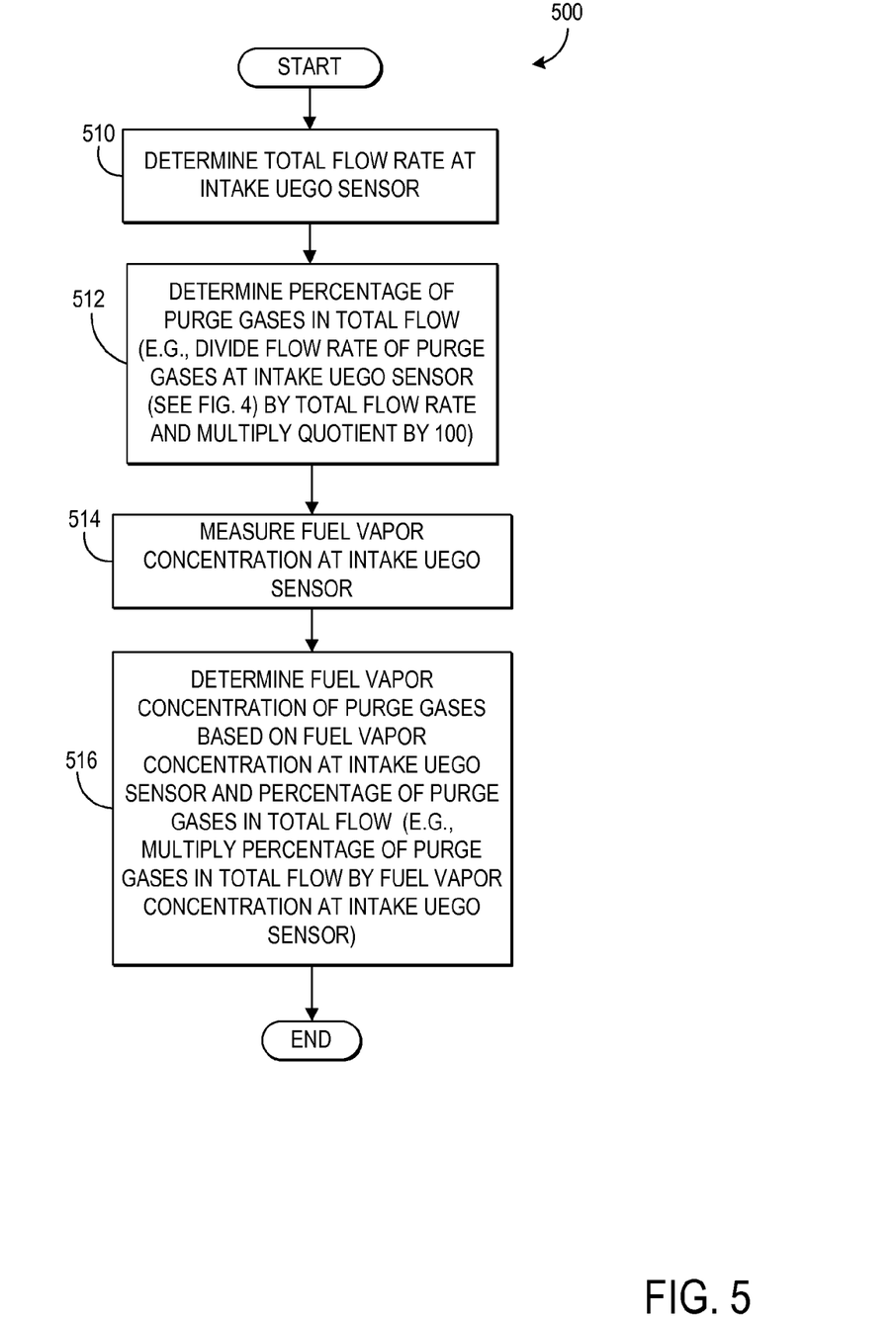
FIG. 5 shows a flow chart illustrating a method for computing the concentration of fuel vapor in fuel vapor purge gases, which may be used in conjunction with the methods of FIGS. 3 and 4.

The flow rate of fuel vapor purge gases at the intake UEGO sensor obtained at step 422 may be used to determine the fuel vapor concentration of the purge gases (e.g., via the method of FIG. 5). Then, the diluent concentration measured by (or computed based on measurements from) the intake UEGO sensor may be compensated based on the fuel vapor concentration of the fuel vapor purge gases. Finally, EGR may be adjusted based on the compensated diluent concentration. Accordingly, by determining the flow rate of fuel vapor purge gases as seen by the intake UEGO sensor via method 400, the diluent concentration measured by the intake UEGO sensor may be compensated to improve adjustment of EGR, without the need for an additional pressure or flow rate sensor at the ejector suction port. It will be appreciated that similar methods may be performed for other vehicle systems communicating with an ejector suction port inlet, depending on whether their flow rate/vacuum characteristics will intersect with ejector suction port flow rate/vacuum characteristics if the characteristics are overlaid. Further, it will be appreciated that the compensated diluent concentration may be used for purposes other than, or in addition to, EGR adjustment.

FIG. 5 shows a flow chart illustrating a method 500 for computing the concentration of fuel vapor in fuel vapor purge gases, which may be used in conjunction with the method of FIGS. 3 and 4. Specifically, method 500 may be performed at step 312 of method 300, in some examples. The fuel vapor concentration computed via method 500 is the concentration of fuel vapor in the purge gases leaving the fuel vapor purge system, e.g. in one or more of flow paths A, B, and C.

At 510, method 500 includes determining the total flow rate at the intake UEGO sensor. In one example, the control system may compute the total flow rate at the intake UEGO sensor as a function of TIP (e.g., as measured by TIP sensor 35 in the system of FIG. 1) and the diameter of the intake passage (e.g., intake passage 22 of FIG. 1). Alternatively, another method may be used to determine the total flow rate at the intake UEGO sensor. In the example vehicle system shown in FIG. 1, the flow rate at the intake UEGO sensor may be a function of the flow rates of purge gases entering the intake passage via one or more of flow paths A, B, and C as well as the flow rate of the boosted intake stream, which may include EGR flow and/or crankcase ventilation flow.

After 510, method 500 proceeds to 512. At 512, method 500 includes determining the percentage of purge gases in the total flow. The determination may include dividing the flow rate of purge gases at the intake UEGO sensor (e.g., as determined via method 400) by the total flow rate at the intake UEGO sensor (e.g., as determined at step 510) and multiplying the quotient by 100. In one illustrative example, it may be determined at step 512 that purge gases make up 10% of the total flow at the intake UEGO sensor. The remaining 90% may comprise intake air, recirculated exhaust from the EGR system, crankcase blowby gases, etc., depending on the configuration of the vehicle system as well as engine operating conditions.

After 512, method 500 proceeds to 514. At 514, method 500 includes measuring the fuel vapor concentration at the intake UEGO sensor. In one example, the sensor may output a voltage proportional to a concentration of fuel vapor (e.g., HC) in the total flow at the sensor, and this voltage may be sent to the control system (e.g., control system 14 of FIG. 1). The control system may then perform computations based on this voltage to determine the concentration of fuel vapor at the sensor. It will be appreciated that even in embodiments where the fuel vapor purge system is the only source of fuel vapor upstream of the intake UEGO sensor, the concentration of fuel vapor at the intake UEGO sensor may not be equal to the concentration of fuel vapor in purge gases, because other constituents (e.g., intake air, diluents from EGR, etc.) may be present in the total flow at the intake UEGO sensor in addition to the purge gases.

After 514, method 500 proceeds to 516. At 516, method 500 includes determining the fuel vapor concentration of purge gases based on the fuel vapor concentration at the intake UEGO sensor (e.g., as determined at step 514) and the percentage of purge gases in the total flow (e.g., as determined at 512). The determination may include multiplying the percentage of purge gases in the total flow by the fuel vapor concentration at the intake UEGO sensor, with the fuel vapor concentration at the intake UEGO sensor converted to a percent composition by the control system. In such an example, 10% of the total flow at the intake UEGO may constitute purge gases, and the percent composition of fuel vapor in the total flow at the intake UEGO sensor may be 5%. By multiplying these two quantities, it may be determined that the fuel vapor concentration of the purge gases (in percent composition form) is 50% fuel vapor, 50% air. This information may then be used in conjunction with the flow rate of purge gases at the intake UEGO sensor (e.g., as determined via method 400) to determine how to compensate the diluent concentration measured by the intake UEGO sensor. The compensated diluent concentration may then be used as a basis for EGR adjustment. For example, while EGR is off, the intake UEGO sensor may function as an intake HC sensor, sensing the fuel vapor concentration. In contrast, while fuel vapor purge is off, the intake UEGO sensor may function as a diluent concentration sensor. However, during conditions when both EGR and fuel vapor purge are on, the fuel vapor concentration may change slowly and thus dilution may be readily separated from the purge vapor effects on the intake UEGO sensor reading.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. An engine method, comprising:
adjusting EGR based on a flow rate at an ejector suction port, the flow rate based on a flow characteristic of the ejector and a flow characteristic of an engine system having an outlet coupled with the port, and not based on sensor readings; and
compensating a measurement of a gas constituent sensor arranged in an engine intake downstream of an outlet of the ejector based on the flow rate.

2. The method of claim 1, further comprising determining a concentration of a reductant in gases from the engine system, wherein compensating the measurement of the gas constituent sensor is further based on the concentration of the reductant.

3. The method of claim 2, further comprising:
during a first condition where all flow leaving the engine system outlet enters the ejector suction port, adjusting EGR based on the flow rate at the ejector suction port; and
during a second condition where less than all flow leaving the engine system outlet enters the ejector suction port, adjusting the flow characteristic of the engine system based on a flow rate in each flow path leaving the engine system outlet and bypassing the ejector suction port, and adjusting EGR based on an adjusted flow rate at the ejector suction port, the adjusted flow rate at the ejector suction port based on the flow characteristic of the ejector and the adjusted flow characteristic of the engine system.

4. The method of claim 3, wherein the flow rate in each flow path leaving the engine system outlet and bypassing the ejector suction port is based on sensed values of temperature and pressure.

5. The method of claim 4, wherein the engine system is a fuel vapor purge system, and wherein the outlet of the fuel vapor purge system is downstream of a canister purge valve (CPV) of the fuel vapor purge system.

6. The method of claim 5, wherein the flow rate in each flow path leaving the outlet of the fuel vapor purge system and bypassing the ejector suction port is further based on a duty cycle of the CPV.

7. An engine system, comprising:
an ejector bypassing an intake compressor, a suction port of the ejector coupled downstream of a fuel vapor purge system, with no sensors arranged between the port and the fuel vapor purge system, the fuel vapor purge system comprising a canister purge valve (CPV);
an exhaust gas recirculation (EGR) system coupled with an intake passage;
a gas constituent sensor arranged in the intake passage downstream of the EGR system and an outlet of the ejector; and
a control system with computer readable instructions for:
adjusting EGR based on a flow rate at the ejector suction port, the flow rate based on a flow characteristic of the ejector and a flow characteristic of the CPV, and not based on sensor readings; and
compensating a measurement of the gas constituent sensor based on the flow rate at the ejector suction port.

8. The system of claim 7, further comprising:
an air induction system (AIS) throttle arranged in the intake passage upstream of the compressor; and
a main throttle arranged in the intake passage downstream of the gas constituent sensor and upstream of the intake manifold.

9. The system of claim 8, further comprising:
a first flow path coupling the CPV of the fuel vapor purge system with the intake passage downstream of the gas constituent sensor when intake manifold pressure is less than barometric pressure;
a second flow path coupling the CPV with the ejector suction port; and
a third flow path coupling the CPV with the intake passage downstream of the AIS throttle when compressor intake pressure is less than barometric pressure.

10. The system of claim 7, wherein the control system further comprises computer readable instructions for determining a concentration of fuel vapor in gases leaving the fuel vapor purge system, and wherein compensating the measurement of the gas constituent sensor is further based on the concentration of fuel vapor.

11. The system of claim 10, wherein the control system further comprises computer readable instructions for adjusting EGR based on the compensated measurement.

12. A method for an engine, comprising:
when all flow leaving an outlet of a fuel vapor purge system enters an ejector suction port, determining a flow rate of the flow entering the ejector suction port, independent of sensor readings, based on an intersection of a flow characteristic of the ejector suction port with a flow characteristic of the fuel vapor purge system,
wherein the flow characteristic of the fuel vapor purge system is based on a duty cycle of a canister purge valve (CPV) of the fuel vapor purge system, and wherein the outlet of the fuel vapor purge system is downstream of the CPV.

13. The method of claim 12, wherein all flow leaving the outlet of the fuel vapor purge system enters the ejector suction port when an air induction system (AIS) throttle arranged upstream of an outlet of the ejector is open and intake manifold pressure is greater than or equal to barometric pressure.

14. The method of claim 13, further comprising compensating a measurement of a gas constituent sensor arranged in an engine intake passage downstream of the outlet of the ejector based on the flow rate of the flow entering the ejector suction port.

15. The method of claim 14, further comprising determining a concentration of fuel vapor in the flow leaving the outlet of the fuel vapor purge system, wherein compensating the measurement of the gas constituent sensor is further based on the concentration of fuel vapor.

16. The method of claim 15, further comprising adjusting exhaust gas recirculation based on the compensated measurement.

* * * * *